G. W. MILLINGTON.
Car-Axle.

No. 200,798.      Patented Feb. 26, 1878.

Witnesses.
Otto Hufeland.
Hugo Brueggemann

Inventor.
George W. Millington
by
Van Santvoord & Hauff
his attorneys

UNITED STATES PATENT OFFICE.

GEORGE W. MILLINGTON, OF WILMINGTON, DELAWARE.

IMPROVEMENT IN CAR-AXLES.

Specification forming part of Letters Patent No. 200,798, dated February 26, 1878; application filed January 23, 1878.

*To all whom it may concern:*

Be it known that I, GEORGE W. MILLINGTON, of Wilmington, in the county of New Castle and State of Delaware, have invented a new and useful Improvement in Car-Axles, which improvement is fully set forth in the following specification, reference being had to the accompanying drawing, in which—

Figure 1:
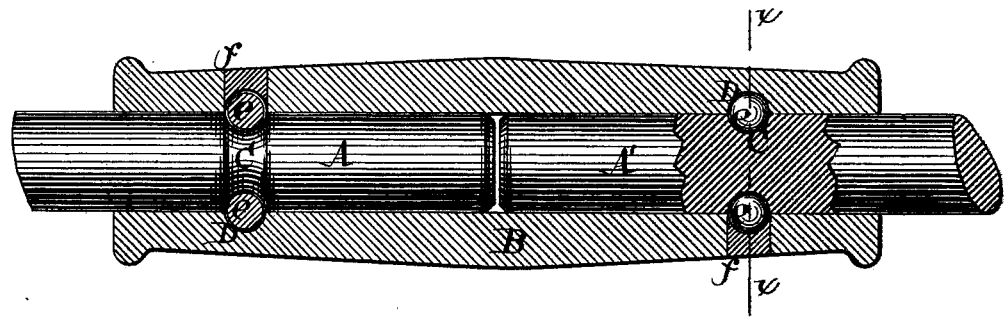
Figure 2:
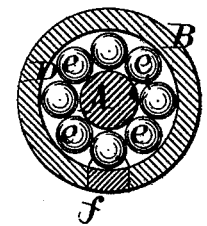

Figure 1 represents a longitudinal section of an axle embracing my invention. Fig. 2 is a cross-section thereof in the line $x\,x$, Fig. 1.

Similar letters indicate corresponding parts.

My invention relates to that class of car-axles constructed of two separate sections or half-axles and a sleeve, to which both of said half-axles are connected in such a manner that one is susceptible of turning independently of the other. In axles of this kind the half-axles and the sleeve have been connected together by means of flanges which are formed at the adjoining ends of the half-axles and catch in suitable grooves of the sleeve, or by means of pins which are passed through the sleeve and catch in grooves formed in the circumference of the half-axles. Both of these connections have the disadvantage that the parts are exposed to a great amount of friction and wear, while the flanges, moreover, render it necessary to construct the sleeve in two parts, and the pins which have been used for locking the half-axles in the sleeve are liable to wear out very rapidly, leaving the half-axles to become detached from the sleeve.

To overcome all these disadvantages, and at the same time produce an effective connection between the half-axles and the sleeve, is the object of my invention.

To this end it consists in the combination of two independent axle-sections or half-axles, each having a circumferential groove, a coupling-sleeve, which is fitted on said sections and provided with two internal grooves, registering with said grooves in the half-axles, and a series of anti-friction balls located in the annular spaces formed by the grooves of said half-axles and of the sleeve, as hereinafter more fully set forth.

In the drawing, the letters A A' designate two sections of a car-axle, and B is a sleeve, to which both of said sections or half-axles are connected according to my invention. On the circumference of each of the half-axles A A' I form a groove, C, and in the interior of the sleeve B, I form two grooves, D, the latter being located at such a part of the sleeve that they register with the grooves C when the half-axles are placed within the sleeve. I make the several grooves C D of equal size to each other and of like cross-section.

Into the annular spaces formed by the grooves C D, I introduce a series of balls, $e$, which are preferably made of chilled iron. These balls $e$ are dropped into place through holes $f$, which are formed in the sleeve B opposite the grooves, and which are plugged with Babbitt or other suitable metal after the balls have been introduced.

The balls $e$ have the effect of preventing a longitudinal movement of the half-axles A A', or, in other words, prevent their becoming detached from the sleeve B, the friction between the parts being at the same time reduced to a minimum, so that there is little occasion for using lubricating material beyond the introduction of a small quantity of graphite, &c. By the employment of the balls I also, to great extent, prevent the liability of the axles setting in the sleeve by reason of their heating, due to rapid revolutions, which will occur where pins are used for connecting the sleeve and the half-axles by reason of the pins being fixed, and hence creating much friction.

I do not confine myself to the application of the sleeve loosely to both half-axles; but in special cases I fasten the sleeve rigidly to one half-axle, and let the other half run free, on the above-described principle.

I am aware that spherical balls have been confined in corresponding recesses or chambers formed in a journal-box, and arranged to revolve in contact with the end of a journal or axle; but such is not my invention, and is hereby disclaimed.

What I claim as new, and desire to secure by Letters Patent, is—

A car-axle composed of two sections, A A', either or both of which is constructed with an annular groove, C, near the adjacent end of the sections, in combination with a sleeve, B, arranged over and upon the two ends of the sectional axle, and having near one or both ends an annular groove, D, and a series of anti-friction balls, e, arranged and inclosed entirely within the said grooves, substantially as set forth.

In testimony that I claim the foregoing I have hereunto set my hand and seal this 15th day of January, 1878.

GEORGE W. MILLINGTON. [L. S.]

Witnesses:
　JAMES L. BLACK,
　WM. S. AUCHINCLOSS.